BEST AVAILABLE COPY
9225x.
J. Elgar,
Paddle Wheel.
Patented Nov. 7, 1835.
BEST AVAILABLE COPY
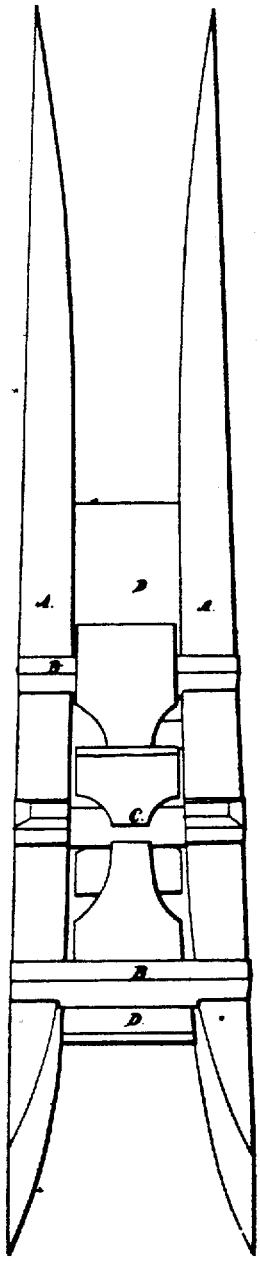

9225x Nov. 7. 1835 561

John Elgar of the City of Baltimore and State of Maryland

The schedule referred to in these Letters Patent and making part of the same containing a description in the words of the said John Elgar himself of his improvement in the Steam Boat for Canals.

---

To all to whom these presents shall come.

Be it known that I John Elgar of the City of Baltimore in the State of Maryland, have invented a new and useful Improvement in the form and construction of Steam boats to be used upon Canals, and that the following is a full and exact description of the construction and operation of the said Steam Boats as invented or improved by me.
——— In the construction of Canal Boats to be propelled by steam Power, I use what is called the twin form, or double boat, that is two boats side by side, and firmly fixed near each other by strong connecting timbers, leaving sufficient space between them for a wheel or paddles to work. ——— In my invention however, the peculiar form of each separate boat differs from that ordinarily used and may be described by supposing a common boat cut in two in the centre longitudinally, then the two outward convex sides placed inward, facing each other so that when they are connected and formed into a twin boat, the outsides shall be straight and parallel to each other whilst the insides shall present curves, diverging from each other toward each end so that the two boats have their due taper altogether on the inside, presenting a narrower space between them near the middle than in the bow or stern. ——— The advantage intended to be gained by adopting this form is that the external sides being straight and parallel may not throw a swell against the Canal banks, and that the swell which would otherwise accumulate in the funnel shaped opening between the bows will be reduced, thrown back and gently distributed in the expanded opening toward the stern by the action of the paddles, and thus produce but little injurious motion in the water of the canal. ——— And to secure the bottom of the Canal from the injurious effects of the agitation of the water under the paddles, I place a sheeting immediately under them and extending back a few feet. This sheeting is parallel

9225X and even with the bottoms of the boat and firmly connected with them.—

What I claim as my invention and for which I ask an exclusive right are, the straight external sides with curved internal sides of a turn Steam Boat to be used on Canals or elsewhere.

Witnesses
Geo. C. H. Wharton
Wm. Henry Stone

Jno. Elgar (462 words)

Patented November 7 1835.

(Drawing.)